United States Patent Office 2,884,355
Patented Apr. 28, 1959

2,884,355

INSECT REPELLENT COMPOSITION COMPRISING A DIETHYL, DI-N-PROPYL OR DI-N-BUTYL PYRIDINE DICARBOXYLATE, A STABILIZER AND A METHOD OF USE

Lyle D. Goodhue, Bartlesville, and Kenneth E. Cantrel, Dewey, Okla., assignors to Phillips Petroleum Company, a corporation of Delaware No Drawing. Application August 30, 1954
Serial No. 453,122

18 Claims. (Cl. 167—33)

This invention relates to fly repellents. In one of its more specific aspects it relates to a method for extending the effective length of time during which compounds repel flies. In another of its more specific aspects it relates to a novel fly repellent composition. In still another of its more specific aspects it relates to a method for increasing the efficiency of fly repellents.

In man's continuing battle against insects, the use of repellents plays an increasingly important role. This is in part due to the fact that insects tend to develop strains which are immune to insecticides such as DDT. It is also in part due to the fact that for the protection of human beings and animals as well as certain foodstuffs, it is preferable to repel rather than to kill insects. It is particularly preferable to repel rather than kill in the case of flies which are known to be notorious carriers of disease.

It has recently been discovered that the diethyl, di-n-butyl and di-n-propyl esters of pyridine dicarboxylic acids are particularly effective agents for repelling flies from surfaces frequented by them, when applied to such surfaces in a suitable carrier. These compounds and methods for using them are more fully disclosed in application Serial No. 240,602, filed August 6, 1951, now Patent No. 2,757,120, by Nelson J. Leonard. The pyridine dicarboxylic acid esters are prepared by esterifying the selected dicarboxylic acid with an appropriate alcohol so as to produce the desired ester. Thus the n-propyl ester of pyridine-2,5-dicarboxylic acid is prepared by the esterification of pyridine-2,5-dicarboxylic acid with n-propyl alcohol.

We have discovered that the effective repellent life of these esters of pyridine dicarboxylic acid can be greatly extended by incorporating in such composition a stabilizing material selected from the group consisting of N-alkyl imides of bicyclo[2.2.1]-5-heptene-2,3-dicarboxylic acid, the alkyl 3-(3,4-methylenedioxybenzene)propyl sulfoxides and certain substituted methylenedioxybenzenes.

These compounds can be represented by the following formulas:

(1) The N-alkyl imides of bicyclo[2.2.1]-5-heptene-2,3-dicarboxylic acid can be represented by the formula

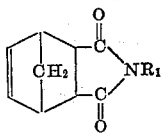

wherein $R_1$ is an alkyl radical containing not more than 12 carbon atoms.

(2) The sulfoxide of isosafrole can be represented by the formula

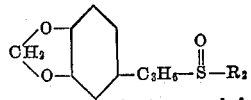

wherein $R_2$ is an alkyl radical containing from 2 to 12 carbon atoms and (3) Substituted methylenedioxybenzenes can be represented by the formula

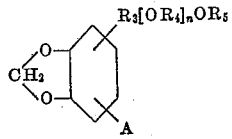

where A is hydrogen or an alkyl radical containing 1 to 6 carbon atoms, $R_3$ and $R_4$ are bivalent paraffin radicals containing 1 to 3 carbon atoms, $R_5$ is an alkyl or cycloalkyl radical containing from 1 to 12 carbon atoms, and $n$ is an integer from 1 to 3.

Representative examples of the N-alkyl imides of bicyclo[2.2.1]-5-heptene-2,3-dicarboxylic acid include N-methyl bicyclo[2.2.1]-5-heptene-2,3-dicarboximide; N-ethyl bicyclo[2.2.1] - 5 - heptene - 2,3 - dicarboximide; N-isopropyl bicyclo[2.2.1] - 5 - heptene - 2,3 - dicarboximide; N - 2 - ethylhexyl bicyclo[2.2.1] - 5 - heptene-2,3 - dicarboximide; N - t - dodecyl bicyclo[2.2.1] - 5-heptene-2,3-dicarboximide; N-isoheptyl bicyclo[2.2.1]-5-heptene - 2,3 - dicarboximide; N - t - butyl bicyclo[2.2.1]-5-heptene - 2,3 - dicarboximide; N - 3 - propyloctyl bicyclo[2.2.1]-5-heptene-2,3-dicarboximide; and N-2,3-dimethyldecyl bicyclo[2.2.1]-5-heptene-2,3-dicarboximide.

Representative examples of alkyl 3-(3,4-methylenedioxybenzene) propyl sulfoxides include ethyl 3-(3,4-methylenedioxybenzene) propyl sulfoxide, propyl 3-(3,4-methylenedioxybenzene) propyl sulfoxide, t-butyl 3-(3,4-methylenedioxybenzene) propyl sulfoxide, n-hexyl 3-(3,4-methylenedioxybenzene) propyl sulfoxide, n-octyl 3-(3,4-methylenedioxybenzene) propyl sulfoxide, n-dodecyl 3-(3,4-methylenedioxybenzene) propyl sulfoxide, 3-butyl-octyl 3-(3,4-methylenedioxybenzene) propyl sulfoxide, 2-ethylpentyl 3-(3,4-methylenedioxybenzene) propyl sulfoxide, and 3-methylhexyl 3-(3,4-methylenedioxybenzene) propyl sulfoxide.

Representative examples of substituted methylenedioxybenzenes include 1[2,5,8-trioxadodecyl]-2-propyl-4,5-methylenedioxybenzene; 1[4,7,10-trimethyl-2,5,8,11-tetraoxanonadecyl] - 3 - n - propyl - 4,5 - methylenedioxybenzene; 1[4,8,12,16-tetraoxaoctacosyl] - 2 - hexyl - 4,5-methylenedioxybenzene; and 1[2,4 - dioxapentyl] - 3,4-methylenedioxybenzene.

The N-alkyl imides of bicyclo[2.2.1]-5-heptene-2,3-dicarboxylic acid anhydride can be prepared by condensing cyclopentadiene with maleic anhydride dissolved in benzene at ordinary room temperature. The resulting condensation product is then reacted with the appropriate alkyl amine to produce the desired product. Thus the condensation product of cyclopentadiene and maleic anhydride is reacted with t-butyl amine to produce N-t-butyl bicyclo[2.2.1]-5-heptene-2,3-dicarboximide.

The sulfoxides of isosafrole can be prepared by oxidation of the addition product of isosafrole and the appropriate aliphatic mercaptan with hydrogen peroxide or other suitable oxygen reagent. Thus the t-butyl mercaptan-isosafrole addition product can be dissolved in glacial acetic acid and treated with 30 percent hydrogen peroxide for a period of several hours so as to produce t-butyl sulfoxide of isosafrole.

The substituted methylenedioxybenzene compounds can be prepared by reacting a halide of methylenedioxybenzene with the sodium salt of the appropriate glycol ether or polyglycol ether to obtain the desired product. Thus the 1[2,5,8-trioxadodecyl] - 2 - propyl - 4,5 - methylenedioxybenzene can be prepared by reacting the chloromethyl derivative of dihydrosafrole with the sodium salt of the mono-n-butyl ether of diethylene glycol.

These compounds greatly extend the useful life of the dialkyl pyridine dicarboxylates hereinbefore referred to. However, we prefer to employ these compounds in compositions containing di-n-propyl pyridine-2,5-dicarboxylate.

The proportions in which these compounds are mixed can vary depending upon the surface to which the materials are applied and also upon the method of application. Preferably, the weight ratio of stabilizing material to the ester of pyridine dicarboxylic acid varies from 5:1 to 1:1, although the ratio can be as high as 10:1 and as low as 0.5:1. Combinations of more than one of the aforementioned pyridine dicarboxylates with one or more of the stabilizers are to be included within the scope of this invention.

The repellent compositions can comprise a mixture of stabilizer and pyridine dicarboxylate dissolved in a suitable solvent as a carrier. Solvents include acetone, hydrocarbons, such as kerosene, naphthas and other liquid hydrocarbons boiling preferably above atmospheric temperature. A preferred solvent is an isoparaffinic hydrocarbon having a boiling range of approximately 260 to 800° F. Solid inert carrier materials can be used, for example, talc, and kieselguhr, when preparing dusts. The stabilized repellents of this invention can also be applied in the form of an aqueous emulsion or dispersion, preferably when a wetting or dispersion agent is employed in preparing such dispersions. Example of suitable wetting agents include sulfonated alkyl benzenes, alkylated aryl polyether alcohols such as Triton X-100; alkali metal aykyl aryl sulfonates such as sodium and potassium alkyl benzene sulfonates and potassium alkyl toluene sulfonates; sulfates of long-chain aliphatic alcohols such as sodium lauryl sulfates; water-soluble salts of organic bases containing a hydrocarbon chain of 8 to 24 carbon atoms, such as hydrochloric, sulfonic, formic, and acetic acid salts of primary, secondary, and tertiary amines such as octyl amines, dodecyl amines, octadecyl amines, and octadecenyl amines; the non-ionic emulsifying agents such as the condensation products of mercaptans with ethylene dioxide; sorbitan monolaurate; sorbitan monolaurate polyoxyethylene derivatives such as Tween 20; and the like.

It is desirable to apply the stabilized compositions of this invention in the form of a very thin film covering the surface which is to be protected. In general, it is sufficient to deposit from 0.01 to 5 grams of the combination of active ingredient and stabilizer per square foot of surface. Preferably, from 0.1 to 3 grams are deposited, although larger or smaller amounts can be applied if desired. The isoparaffinic hydrocarbon referred to above is a particularly desirable solvent for the stabilized compositions of this invention because it has the property of spreading into a thin film and covering a large surface area and this property is particularly desirable for uniformly spreading a thin film of the stabilized composition of this invention onto the surface to be protected.

The amount of stabilized composition, comprising the stabilizer and the dialkyl pyridine dicarboxylate, employed in a solution or a dispersion for application to the surface from which insects are to be repelled, will generally be in the concentration of about 0.3 to 30 weight percent of the carrier material. A more preferred range of concentration will be 0.5 to 15 weight percent of the carrier material. The stabilized repellent composition can be used without a carrier if desired.

A preferred stabilized composition according to our invention is a combination of 0.5 to 10 parts by weight of stabilizing material per part of ester of pyridine dicarboxylic acid and a wetting agent as hereinbefore disclosed in the range of from 0.03 to 0.1 part of wetting agent per part of stabilized composition. This composition is particularly preferred because such composition can be directly incorporated into water so as to form an aqueous dispersion and also can be directly incorporated into an isoparaffinic hydrocarbon, referred to above, so as to form a solution. Thus our preferred composition provides a stabilized repellent adapted to form a hydrocarbon solution or to form an aqueous dispersion.

The method used to determine the repellent action of these mixtures was the Sandwich Bait Method, more fully described hereinafter. Briefly, this method consists of exposing hungry houseflies to a strip of molasses covered by a strip of porous paper previously impregnated with the repellent. The number of flies feeding on the molasses through the paper is recorded at intervals of 15 minutes. The number of flies and the rate at which the molasses is consumed gives a good measure of repellency. Paper impregnated with di-n-propyl pyridine-2,5-dicarboxylate and aged from 4 to 6 hours repelled 100 percent of the flies. Similar impregnated papers were aged for an additional length of time and it was found that repellency of the compounds had been reduced to comparatively ineffective ranges. Papers, thus aged, were then compared in repellency with papers impregnated with the heretofore described mixtures and aged under similar conditions. As can be seen by the results given in the examples, these mixtures showed repellent action which persisted in some cases for a week or longer.

EXAMPLE 1

Repellency to houseflies was determined by the Sandwich Bait Method which is essentially that described by L. B. Kilgore in Soap, June 1949. In accordance with this method, to a sheet of cardboard were applied two smooth thin strips of unsulfured molasses about ⅜ inch wide and 3½ inches long, leaving a margin of at least ¼ inch all around and a space of at least an inch between the strips. The prepared cardboard strips were then oven-dried at 45° C. Strips of highly porous lens paper one by four inches in dimensions, were impregnated with the chemical to be tested as a fly repellent by immersing them in an acetone solution containing the desired quantity of the chemical and then allowing the strips to dry over a period of 4 to 6 hours. An impregnated strip was superimposed on each strip of molasses and was fastened in place by stapling it to the cardboard backing. The loose fiber construction of the impregnated paper permits the flies to remove the molasses through it.

The prepared strips, i.e., the Sandwich Bait, were then exposed to about 150 houseflies Musca domestica, over five days old, which had been starved for 6 hours. Counts of the number of flies feeding on the strips were taken periodically for 2½ or 2¾ hours. When the material with which the porous paper is impregnated is not repellent the strips become black with flies soon after being exposed and the bait will often be consumed in five minutes. When it is desired to repeat the test after the impregnated papers have been aged for an additional length of time, the molasses coated cardboard was replaced by a freshly-coated piece of cardboard and covered with another impregnated strip, which had been aged for the desired period, before the test began.

Strips of paper impregnated with di-n-propyl pyridine-2,5-dicarboxylate were tested by the Sandwich Bait Method described above. The strips were aged for a period of from 4 to 6 hours before being tested. The results are given below in Table I. They show the high repellency of this compound to houseflies at the end of the aging period.

*Table I*

| Compound | Concentration of Dipping Solution, Wt. Percent [1] | Number of Flies Feeding, Minutes ||||||||
|---|---|---|---|---|---|---|---|---|---|
| | | 5 | 15 | 30 | 45 | 60 | 90 | 120 | 150 |
| Di-n-propyl pyridine-2,5-dicarboxylate | 0.5 | 0 | 0 | 0 | 0 | 0 | 0 | 0 | 0 |

[1] Concentration of compound in acetone solution employed in impregnation of porous strips.

EXAMPLE 2

The stabilizers alone showed very little repellency to houseflies when tested by the Sandwich Bait Method described above. The impregnated strips were tested after they had been aged indoors for 4 hours. Results are given in Table II.

Table II

| Compound | Concentration of Dipping Solution, Weight Percent [1] | Number of Flies Feeding, Minutes | | | | |
|---|---|---|---|---|---|---|
| | | 5 | 15 | 30 | 45 | 60 |
| A [2] | 1 | 3 | 5 | 26 | [5] gone | |
| B [3] | 1 | 8 | 32 | [5] gone | | |
| C [4] | 1 | 0 | 0 | 22 | 4 | [5] gone |

[1] Concentration of compound in acetone solution employed in impregnation of porous strips.
[2] N-2-ethylhexyl bicyclo[2.2.1]-5-heptene-2,3-dicarboximide.
[3] 1[2,5,8-trioxadodecyl]-2-propyl-4,5-methylenedioxybenzene.
[4] n-Octyl 3-(3,4-methylenedioxybenzene) propyl sulfoxide.
[5] Molasses completely consumed.

EXAMPLE 3

Strips of paper impregnated with di-n-propyl pyridine-2,5-dicarboxylate alone and with mixtures of this compound with each of the compounds tested in Example 2 were tested by the Sandwich Bait Method described above after having been aged for one day. Some of the strips were aged in a room containing a small amount of ammonia in the atmosphere as a result of the continuous presence of experimental animals and insects. The remainder of the strips were aged outdoors. During approximately 8 hours of this outdoor aging period they were exposed to direct sunlight. The results, given below in Table III, when compared with the results given in Table II, show that the duration of the repellency of di-n-propyl pyridine-2,5-dicarboxylate is extended by the stabilizing compounds of this invention.

Table III

| Compound | A | | B | | C | | D | |
|---|---|---|---|---|---|---|---|---|
| Indoors or Outdoors | In [1] | Out | In [1] | Out | In [1] | Out | In [1] | Out |
| Number of Flies Feeding at X Minutes: | | | | | | | | |
| 5 | 3 | 6 | 0 | 0 | 0 | 0 | 0 | 0 |
| 15 | 3 | 14 | 0 | 0 | 0 | 0 | 0 | 0 |
| 30 | 4 | [2] gone | 0 | 0 | 0 | 0 | 0 | 0 |
| 45 | [2] gone | | 0 | 0 | 0 | 0 | 0 | 0 |
| 60 | | | 0 | 0 | 0 | 0 | 0 | 0 |
| 90 | | | 0 | 0 | 0 | 0 | 0 | 0 |
| 105 | | | 0 | 0 | 0 | 0 | 0 | 0 |
| 120 | | | 0 | 0 | 0 | 0 | 0 | 0 |
| 135 | | | 0 | 0 | 0 | 0 | 0 | 0 |
| 150 | | | 0 | 0 | 0 | 0 | 0 | 0 |
| 165 | | | 0 | 0 | 0 | 0 | 0 | 0 |

A = 0.5 wt. percent of di-n-propyl pyridine-2,5-dicarboxylate in acetone.
B = 0.5 wt. percent of di-n-propyl pyridine-2,5-dicarboxylate plus 1 wt. percent of N-ethylhexyl bicyclo[2.2.1]-5-heptene-2,3-dicarboximide.
C = 0.5 wt. percent of di-n-propyl pyridine-2,5-dicarboxylate plus 1 wt. percent 1[2,5,8-trioxadodecyl]-2-propyl-4,5-methylenedioxybenzene.
D = 0.5 wt. percent of di-n-propyl pyridine-2,5-dicarboxylate plus 1 wt. percent n-octyl 3-(3,4-methylenedioxybenzene) propyl sulfoxide.

[1] Small amount of naturally-occurring $NH_3$ present in the atmosphere.
[2] Molasses completely consumed.

EXAMPLE 4

Strips of paper impregnated with di-n-propyl pyridine-2,5-dicarboxylate alone and with mixtures of this compound with each of the compounds tested in Example 2 were tested by the Sandwich Bait Method described above after having been aged for one week in a room containing a small amount of ammonia in the atmosphere as a result of the continuous presence of experimental animals and insects. The results are given below in Table IV. When compared with the figures given in Table II, they show that the stabilizers of the invention, when combined with di-n-propyl pyridine-2,5-dicarboxylate, produce mixtures which remain effective as housefly repellents for an extended period of time.

Table IV

| Compound | A | B | C | D |
|---|---|---|---|---|
| Number of Flies Feeding at X Minutes: | | | | |
| 5 | 0 | 5 | 0 | 0 |
| 15 | 2 | 7 | 0 | 0 |
| 30 | 2 | 4 | 1 | 1 |
| 45 | 2 | 2 | 0 | 0 |
| 60 | 8 | 2 | 0 | 1 |
| 75 | [1] gone | 1 | 1 | 3 |
| 90 | | 0 | 2 | 1 |
| 105 | | 0 | 1 | 5 |
| 120 | | 0 | 0 | 0 |
| 135 | | 0 | 2 | 0 |
| 150 | | 1 | 0 | 1 |
| 165 | | [1] gone | 0 | 3 |

A = 0.5 wt. percent of di-n-propyl pyridine-2,5-dicarboxylate.
B = 0.5 wt. percent of di-n-propyl pyridine-2,5-dicarboxylate and 1 wt. percent N-ethylhexyl bicyclo[2.2.1]-5-heptene-2,3-dicarboximide.
C = 0.5 wt. percent of di-n-propyl pyridine-2,5-dicarboxylate and 1 wt. percent 1[2,5,8-trioxadodecyl]-2-propyl-4,5-methylenedioxybenzene.
D = 0.5 wt. percent of di-n-propyl pyridine-2,5-dicarboxylate and 1 wt. percent n-octyl 3-(3,4-methylenedioxybenzene) propyl sulfoxide.

[1] Molasses completely consumed.

EXAMPLE 5

Tests were made by the Sandwich Bait Method described above, of one of the stabilizing materials compared with one of the repellents and also tests of a combination of the two materials. Table V shows the results of tests wherein the materials were aged 24 hours prior to use and Table VI shows results of tests wherein the materials were aged for one week prior to use.

Table V
COMPOUNDS AGED 24 HOURS

| Compound | F | | A | | E | | B | |
|---|---|---|---|---|---|---|---|---|
| Indoors or Outdoors | In | Out | In | Out | In | Out | In | Out |
| Number of Flies Feeding at X Minutes: | | | | | | | | |
| 5 | 0 | 0 | 3 | 6 | 0 | 0 | 0 | 0 |
| 15 | 2 | 2 | 3 | 14 | 0 | 0 | 0 | 0 |
| 30 | 1 | 35 | 4 | [1] gone | 0 | 0 | 0 | 0 |
| 45 | 0 | 40 | [1] gone | | 0 | 0 | 0 | 0 |
| 60 | 8 | 12 | | | 0 | 0 | 0 | 0 |
| 75 | 20 | [1] gone | | | 0 | 0 | 0 | 0 |
| 90 | 13 | | | | 0 | 0 | 0 | 0 |
| 105 | 6 | | | | 0 | 0 | 0 | 0 |
| 120 | [1] gone | | | | 0 | 0 | 0 | 0 |
| 135 | | | | | 0 | 0 | 0 | 0 |
| 150 | | | | | 0 | 0 | 0 | 0 |
| 165 | | | | | 0 | 0 | 0 | 0 |

F = 1.5 wt. percent of N-ethylhexyl bicycle[2.2.1]-5-heptene-2,3-dicarboximide in acetone.
A = 0.5 wt. percent of di-n-propyl pyridine-2,5-dicarboxylate in acetone.
E = 1.5 wt. percent of di-n-propyl pyridine-2,5-dicarboxylate in acetone.
B = 0.5 wt. percent of di-n-propyl pyridine-2,5-dicarboxylate plus 1 wt. percent of N-ethylhexyl bicyclo[2.2.1]-5-heptene-2,3-dicarboximide in acetone.

[1] Molasses completely consumed.

Table VI
COMPOUNDS AGED ONE WEEK

| Compound | F | | A | | E | | B | |
|---|---|---|---|---|---|---|---|---|
| Indoors or Outdoors | In | Out | In | Out | In | Out | In | Out |
| Number of Flies Feeding at X Minutes: | | | | | | | | |
| 5 | 12 | 4 | 0 | | 0 | 0 | 5 | |
| 15 | 50+ | 50+ | 2 | | 0 | 0 | 7 | |
| 30 | 14 | 23 | 2 | | 1 | 3 | 4 | |
| 45 | 8 | 5 | 8 | | 0 | 0 | 2 | |
| 60 | 4 | 10 | [1] gone | | 0 | 1 | 2 | |
| 75 | 1 | 10 | | | 0 | 0 | 1 | |
| 90 | 1 | 3 | | | 1 | 12 | 0 | |
| 105 | 0 | [1] gone | | | 0 | 8 | 0 | |
| 120 | 0 | | | | 0 | 0 | 0 | |
| 135 | 2 | | | | 0 | 0 | 0 | |
| 150 | 0 | | | | 0 | 2 | 1 | |
| 165 | 0 | | | | 0 | 14 | [1] gone | |

F = 1.5 wt. percent of N-ethylhexyl bicyclo[2.2.1]-5-heptene-2,3-dicarboximide in acetone.
A = 0.5 wt. percent of di-n-propyl pyridine-2,5-dicarboxylate in acetone.
E = 1.5 wt. percent of di-n-propyl pyridine-2,5-dicarboxylate in acetone.
B = 0.5 wt. percent of di-n-propyl pyridine-2,5-dicarboxylate plus 1 wt. percent of N-ethylhexyl bicyclo[2.2.1]-5-heptene-2,3-dicarboximide in acetone.

[1] Molasses completely consumed.

Reasonable variations and modifications are possible within the scope of the disclosure of the invention, the essence of which is the discovery that N-alkyl imides of dicyclo[2.2.1]-5-heptene-2,3-dicarboxylic acid; alkyl 3-(3,4-methylenedioxybenzene) propyl sulfoxides; and certain substituted methylenedioxybenzenes, when combined with the diethyl, di-n-propyl and di-n-butyl esters of pyridine dicarboxylic acid greatly extend the length of time during which the compounds repel flies.

That which is claimed is:

1. An improved fly repellent composition comprising about one part by weight of di-n-propyl pyridine dicarboxylate and about one to ten parts by weight of N-ethylhexyl bicyclo [2.2.1]-5-heptane-2,3-dicarboxyimide.

2. An improved fly repellent composition comprising about one part by weight of di-n-propyl pyridine dicarboxylate and one to ten parts by weight of 1[2,5,8-trioxadodecyl]-2-propyl-4,5-methylenedioxybenzene.

3. An improved fly repellent composition comprising about one part by weight of di-n-propyl pyridine dicarboxylate and about two parts by weight of n-octyl 3-(3,4-methylenedioxybenzene) propyl sulfoxide.

4. An improved method for repelling flies from a surface frequented by flies which comprises applying to said surface a composition comprising about 1 part by weight of di-n-propyl pyridine dicarboxylate and about 1 part by weight of N-ethylhexyl-bicyclo[2.2.1]-5-heptane-2,3-dicarboxyimide dispersed in a substantially inert adjuvant as a carrier therefore.

5. An improved fly repellent composition comprising about 1 part by weight of a dicarboxylate selected from the group consisting of diethyl-, di-n-propyl-, and di-n-butyl pyridine dicarboxylates and about 1 to 10 parts by weight of a stabilizing compound selected from the group consisting of N-ethylhexyl bicyclo [2.2.1]-5-heptane-2,3-dicarboxyimide and 1[2,5,8-trioxadodecyl]-2-propyl-4,5-methylenedioxybenzene.

6. A composition according to claim 5 wherein the stabilizing compound is N-ethylhexyl bicyclo [2.2.1]-5-heptane-2,3-dicarboxyimide.

7. A composition according to claim 5 wherein the stabilizing compound is 1[2,5,8-trioxadodecyl]-2-propyl-4,5-methylenedioxybenzene.

8. A composition according to claim 5 wherein the dicarboxylate is diethyl pyridine dicarboxylate.

9. A composition according to claim 5 wherein the dicarboxylate is di-n-propyl pyridine dicarboxylate.

10. A composition according to claim 5 wherein the dicarboxylate is di-n-butyl pyridine dicarboxylate.

11. An improved fly repellent composition comprising about one part by weight of diethyl pyridine dicarboxylate and about two parts by weight of n-octyl 3-(3,4-methylenedioxybenzene) propyl sulfoxide.

12. An improved fly repellent composition comprising about 1 part by weight of di-n-butyl pyridine dicarboxylate and about 2 parts by weight of n-octyl 3-(3,4-methylenedioxybenzene) propyl sulfoxide.

13. An improved method for repelling flies from a surface frequented by flies which comprises applying to said surface a composition comprising about 1 part by weight of a dicarboxylate selected from the group consisting of diethyl-, di-n-propyl, and di-n-butyl pyridine dicarboxylate and about 1 to 10 parts by weight of a stabilizer selected from the group consisting of N-ethylhexyl bicyclo [2.2.1]-5-heptane-2,3-dicarboxyimide and 1[2,5,8 - trioxadodecyl]-2-propyl-4,5-methylenedioxybenzene dispersed in a substantially inert adjuvant as a carrier therefor.

14. The method of claim 13 wherein the dicarboxylate is diethyl pyridine dicarboxylate.

15. The method of claim 13 wherein the dicarboxylate is di-n-butyl pyridine dicarboxylate.

16. The method of claim 13 wherein the dicarboxylate is di-n-propyl pyridine dicarboxylate.

17. The method of claim 16 wherein the stabilizer is N-ethylhexyl bicyclo [2.2.1]-5-heptane-2,3-dicarboxyimide.

18. The method of claim 16 wherein the stabilizer is 1[2,5,8 - trioxadodecyl]-2-propyl - 4,5 - methylenedioxybenzene.

References Cited in the file of this patent

UNITED STATES PATENTS

| | | |
|---|---|---|
| 2,424,220 | Bousquet | July 22, 1947 |
| 2,757,120 | Leonard | July 31, 1956 |

OTHER REFERENCES

King: Chem. Evaluated as Insecticides and Repellents at Orlando, Fla., U.S. Dept. of Agr. Handbook No. 69, May 1954.

Cole: J. of Econ. Entomology, vol. 42, No. 6, pp. 880, 881, 1949.

Hartzell: Contributions from Boyce Thompson Inst., vol. 15, 1949, pp. 337–339.

Gersdorff: J. of Econ. Entomology, vol. 45, December 1952, No. 6, pp. 905–908.

Black et al.: J. Org. Chem., vol. 14, pp. 14–21, 1949.

Prostenik et al.: Archiv. Kemi., vol. 18, 1946, pp. 3–9. (Chem. Abst., vol. 42, 1948, p. 3398C.)

OSRD Insect Control Committee Report No. 28, Interim Report No. 0–94, May 18, 1945. Publ. date: August 1, 1947, 50 pp. plus one page of index, part. at page 27, Orlando No. 0–2333, Pyridine-2,3-dicarboxylic acid, dimethyl ester, and pp. 1–4, 9. 16 and 21 for methods of using the repellents.

UNITED STATES PATENT OFFICE
CERTIFICATE OF CORRECTION

Patent No. 2,884,355                                    April 28, 1959

Lyle D. Goodhue et al

It is hereby certified that error appears in the printed specification of the above numbered patent requiring correction and that the said Letters Patent should read as corrected below.

Column 3, line 29, for "aykyl" read -- alkyl --; column 4, line 14, for "papere" read -- papers --; column 7, lines 14, 27, 35, 40, and column 8, lines 12 and 23, for "heptane", in each occurrence, read -- heptene --.

Signed and sealed this 22nd day of March 1960.

(SEAL)
Attest:

KARL H. AXLINE                                          ROBERT C. WATSON
Attesting Officer                                        Commissioner of Patents